(12) United States Patent
Turner et al.

(10) Patent No.: US 7,958,733 B2
(45) Date of Patent: Jun. 14, 2011

(54) JET ENGINE EXHAUST NOZZLE FLOW EFFECTOR

(75) Inventors: Travis L. Turner, Newport News, VA (US); Roberto J. Cano, Yorktown, VA (US); Richard J. Silcox, Poquoson, VA (US); Ralph D. Buehrle, Williamsburg, VA (US); Christopher M. Cagle, Yorktown, VA (US); Randolph H. Cabell, Hampton, VA (US); George C. Hilton, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 928 days.

(21) Appl. No.: 11/762,827

(22) Filed: Jun. 14, 2007

(65) Prior Publication Data
US 2008/0272232 A1 Nov. 6, 2008

Related U.S. Application Data

(60) Provisional application No. 60/805,262, filed on Jun. 20, 2006, provisional application No. 60/895,202, filed on Mar. 16, 2007.

(51) Int. Cl.
*F02K 1/00* (2006.01)

(52) U.S. Cl. ............................................. 60/770; 60/771
(58) Field of Classification Search .................... 60/770, 60/771
See application file for complete search history.

(56) References Cited

U.S. PATENT DOCUMENTS

| | | | |
|---|---|---|---|
| 5,804,276 A | 9/1998 | Jacobs et al. | |
| 6,105,904 A | 8/2000 | Lisy et al. | |
| 6,260,795 B1 | 7/2001 | Gay et al. | |
| 6,685,143 B1 | 2/2004 | Prince et al. | |
| 6,832,478 B2 | 12/2004 | Anderson et al. | |
| 6,837,465 B2 | 1/2005 | Lisy et al. | |
| 7,037,076 B2 | 5/2006 | Jacot et al. | |
| 7,070,144 B1 | 7/2006 | DiCocco et al. | |
| 7,216,831 B2 | 5/2007 | Wood | |
| 2006/0101803 A1* | 5/2006 | White | 60/204 |
| 2006/0124801 A1 | 6/2006 | Wood | |
| 2006/0267376 A1 | 11/2006 | McKnight et al. | |

* cited by examiner

*Primary Examiner* — Michael Cuff
*Assistant Examiner* — Andrew Nguyen
(74) *Attorney, Agent, or Firm* — Andrea Z. Warmbier; Helen M. Galus; Barry V. Gibbens

(57) ABSTRACT

A jet engine exhaust nozzle flow effector is a chevron formed with a radius of curvature with surfaces of the flow effector being defined and opposing one another. At least one shape memory alloy (SMA) member is embedded in the chevron closer to one of the chevron's opposing surfaces and substantially spanning from at least a portion of the chevron's root to the chevron's tip.

18 Claims, 7 Drawing Sheets

JET ENGINE EXHAUST NOZZLE FLOW EFFECTOR

Pursuant to 35 U.S.C. §119, the benefit of priority from provisional applications 60/805,262 with a filing date of Jun. 20, 2006, and 60/895,202 with a filing date of Mar. 16, 2007, is claimed for this non-provisional application.

ORIGIN OF THE INVENTION

The invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to flow effector design. More specifically, the invention is an active flow effector that can be coupled to a jet engine exhaust nozzle to affect the flow exiting therefrom.

2. Description of the Related Art

Reduction of Jet engine noise in the vicinity of airports continues to be of paramount importance. Jet exhaust-nozzle chevron systems are a proven noise reduction technology, but much is yet to be learned about their parametric design space. Furthermore, a tradeoff between noise reduction at takeoff and thrust loss at cruise has slowed their incorporation into production engines. The presence of chevrons arranged about the periphery of a nozzle produces a scalloped (or serrated) trailing edge with the chevrons protruding into the flow, increasingly from root to tip, in the flow direction. Model-scale noise reduction and/or flow studies involving chevrons have generally been performed using static chevron technology where the geometry and resulting flow immersion is predetermined and invariant. These studies typically included some parametric investigation of chevron number geometry and degree of immersion. However, detailed parametric investigations using static chevrons are not feasible because of the high cost of fabricating and testing separate nozzle systems. Numerical studies are also limited for investigation of the parametric design space because of questionable fidelity in noise predictions. Furthermore, it is certain that parametric effects will vary from one engine to another and will be dependent upon operating conditions.

One means of simultaneously addressing some parametric design issues and the tradeoff of noise reduction and thrust penalty is the development of active chevrons. To date, active chevron development has focused on the attachment of shape memory alloy (SMA) bender elements to a chevron surface. However, this approach (i) suffers from space, mass and mechanical inefficiencies, (ii) requires auxiliary heating elements, (iii) produces undesirable deformation effects, and (iv) is subject to attachment problems.

SUMMARY OF THE INVENTION

Accordingly, it is an object of the present invention to provide a flow effector that can be used to reduce jet engine noise generated at the jet engine's nozzle.

Another object of the present invention is to provide an active flow effector for use at a jet engine exhaust nozzle.

Other objects and advantages of the present invention will become more obvious hereinafter in the specification and drawings.

In accordance with the present invention, a jet engine exhaust nozzle flow effector includes an elastically deformable chevron having a root and a tip. The chevron is formed with a radius of curvature that matches the geometry of a portion of a jet engine exhaust nozzle exit such that an inner surface and an outer surface are defined and oppose one another with the inner surface facing the axial center of the nozzle exit. In one embodiment, at least one shape memory alloy (SMA) member is embedded in the chevron closer to the inner surface than the outer surface and substantially spanning from at least a portion of the chevron's root to the chevron's tip. In another embodiment, at least one shape memory alloy (SMA) member is embedded in the chevron closer to the outer surface than the inner surface and substantially spanning from at least a portion of the chevron's root to the chevron's tip.

DETAILED DESCRIPTION OF THE INVENTION

Figure 1:
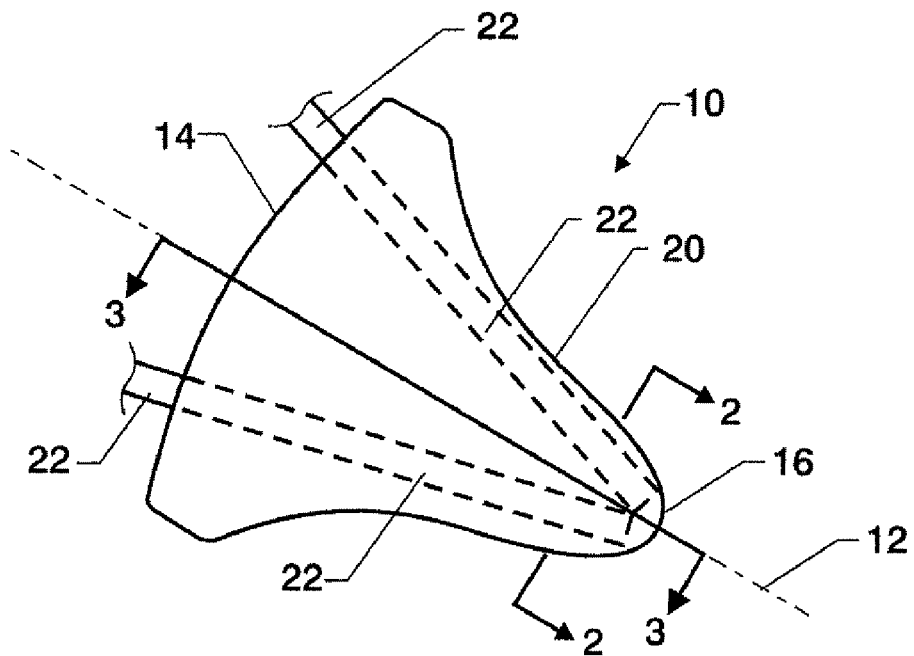
FIG. 1 is a top view of chevron-shaped flow effector having a cylindrical radius of curvature for use in controlling jet engine noise in accordance with an embodiment of the present invention.

Referring now to the drawings, simultaneous reference will be made to FIGS. 1-3 where a first embodiment of a flow effector for use in controlling jet engine noise is illustrated and is referenced generally by number 10. Flow effector 10 is generally a chevron-shaped flow effector that is symmetrical about its centerline referred by dashed line 12. In its chevron shape, flow effector 10 has a root 14 and a tip 16. When used in conjunction with a jet engine, flow effector 10 is mounted to the jet engine's nozzle. More specifically and as would be understood in the art, root 14 is attached to a region of the jet engine nozzle such that tip 16 is positioned aft of the nozzle's exit (illustrated in FIG. 2 by dashed line 100). In the illustrated example, the jet engine nozzle exit 100 is assumed to be circular so that flow effector 10 has a cylindrical radius of curvature that is geometrically matched to a portion of nozzle exit 100. However, as will be explained further below, the flow effector can be readily adapted to accommodate other nozzle exit geometries, e.g., rectangular, elliptical, etc., without departing from the scope of the present invention.

Since a plurality of flow effectors 10 would typically be attached to and distributed about the periphery of exit 100, flow effector 10 is generally shaped about centerline 12 to have a radius of curvature closely matching a corresponding portion of the jet engine nozzle exit 100. This is best seen in the cross-sectional view shown in FIG. 2. Thus, in the illustrated example, one surface 10A of flow effector 10 is convex while the opposing surface 10B is concave. More generally, surface 10A faces away from the axial center 102 of nozzle exit 100 while surface 10B faces towards axial center 102 as will always be the case regardless of the geometries of the nozzle exit and flow effectors.

In general, flow effector 10 includes an elastically deformable chevron body 20 and one or more shape memory alloy (SMA) members 22 embedded within chevron body 20 and arranged to form a V-shape. As will be explained further below, SMA members 22 are used to deform chevron body 20 in order to alter the flow of exhaust exiting a jet engine nozzle where such alteration reduces jet engine noise. Accordingly, chevron body 20 must be of a deformable construction so that when SMA members 22 are actuated, they can re-shape chevron body 20. Since it may be desirable for chevron body 20 to re-attain its original shape when SMA members are deactivated, chevron body 20 will typically be constructed to be elastically deformable.

Figure 2:
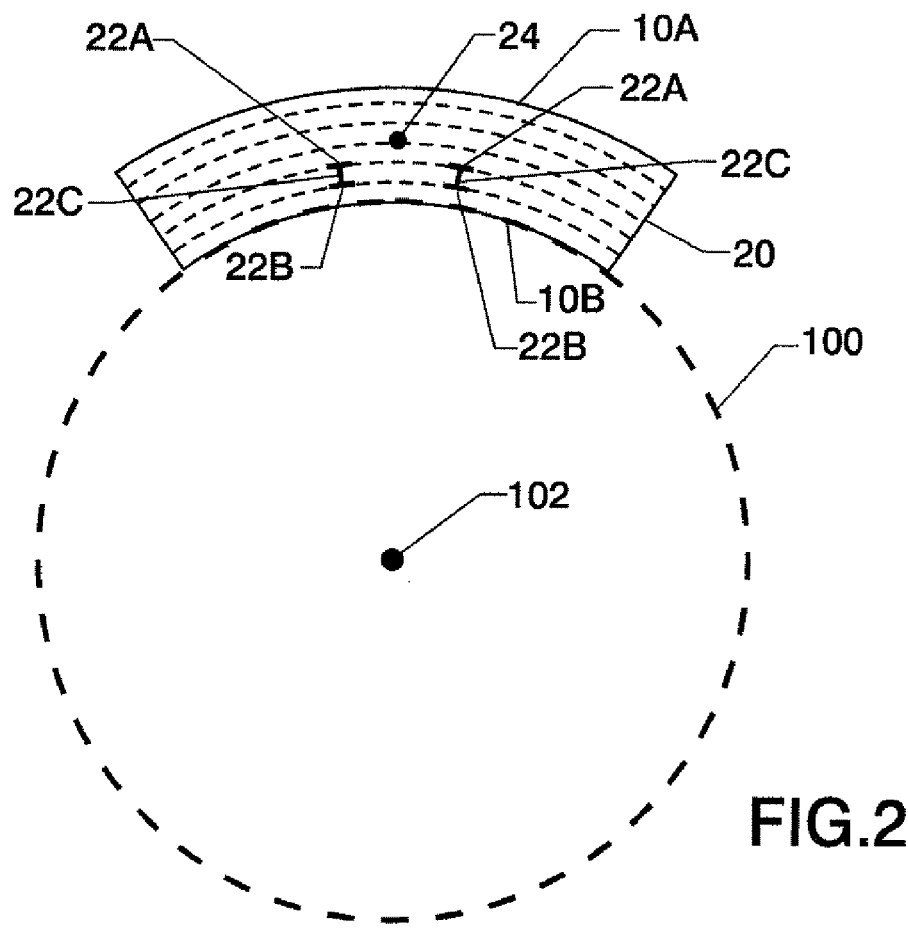
FIG. 2 is a cross-sectional view of the flow effector taken along line 2-2 in FIG. 1.

In the illustrated embodiment, chevron body 20 is a laminated structure with the delineation between the various layers thereof being indicated by the dashed lines in FIG. 2. Note that the number of layers comprising chevron body 20 is not a limitation of the present invention. Furthermore, the materials used to construct chevron body 20 can be any that will provide elastic deformation properties. When SMA members 22 are to be electrically actuated, it is advantageous if the material layers of chevron body 20 comprise an electrical insulating material to simplify the manufacturing of flow effector 10.

In at least one embodiment, to maximize control of flow effector 10, SMA members 22 span substantially the entire flow length of flow effector 10 from tip 16 to root 14. Each of SMA members 22 can be realized by a simple SMA wire, ribbon, etc., or multiple ones of such wires, ribbons, etc. However, to simplify the actuation of SMA members 22 (i.e., either by electrical or thermal actuation) while keeping convex surface 10A and concave surface 10B free of surface interruptions, SMA members 22 are accessible at the end of root 14 or extend from root 14. For example, in the illustrated embodiment, each SMA member 22 comprises first and second SMA ribbons 22A and 22B separated from one another by a layer of chevron body 20 and electrically connected to one another by an electrical connection 22C near tip 16. In this way, each SMA member 22 defines an electrical conductor having two terminals (i.e., the ends of SMA ribbons 22A and 22B at root 14) accessible at root 14.

Figure 3:
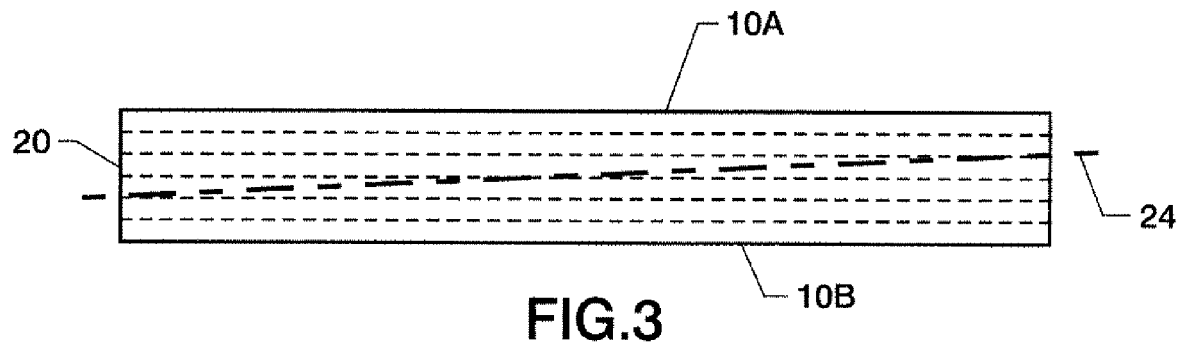
FIG. 3 is a cross-sectional view of the flow effector taken along the centerline thereof as indicated by line 3-3 in FIG. 1.

The embodiment illustrated in FIGS. 1-3 is designed such that tip 16 can be drawn towards the axial center 102 of jet engine nozzle exit 100. This will generally be achievable when SMA members 22 are located (i) closer to surface 10B than surface 10A, and (ii) between the bending or neutral axis 24 and surface 10B as shown in FIG. 2. As would be understood in the art, neutral axis 24 is the axis where bending stresses experienced by chevron body 20 transition from compression to tension or vice versa. When chevron body 20 is constructed from a homogeneous material, neutral axis 24 generally coincides with the centroidal axis (i.e., the center of mass axis) of the chevron body. However, the chevron's neutral axis and centroidal axis can be different when chevron body 20 is constructed from a variety of materials as is possible in a laminated construction. When SMA members 22 are positioned as just described and contracted after electrical or thermal stimulation thereof, tip 16 will be drawn towards axial center 102 of nozzle exit 100.

Figure 4:
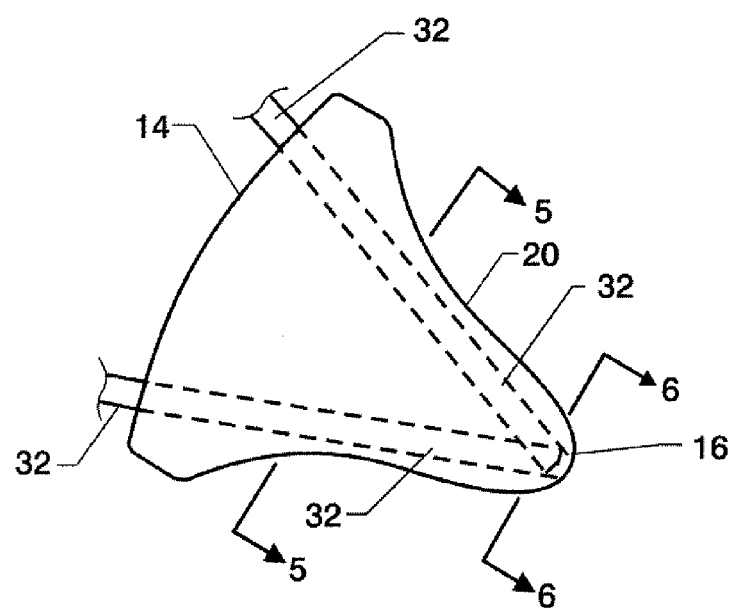
FIG. 4 is a top view of a chevron-shaped flow effector in accordance with another embodiment of the present invention.
Figure 5:
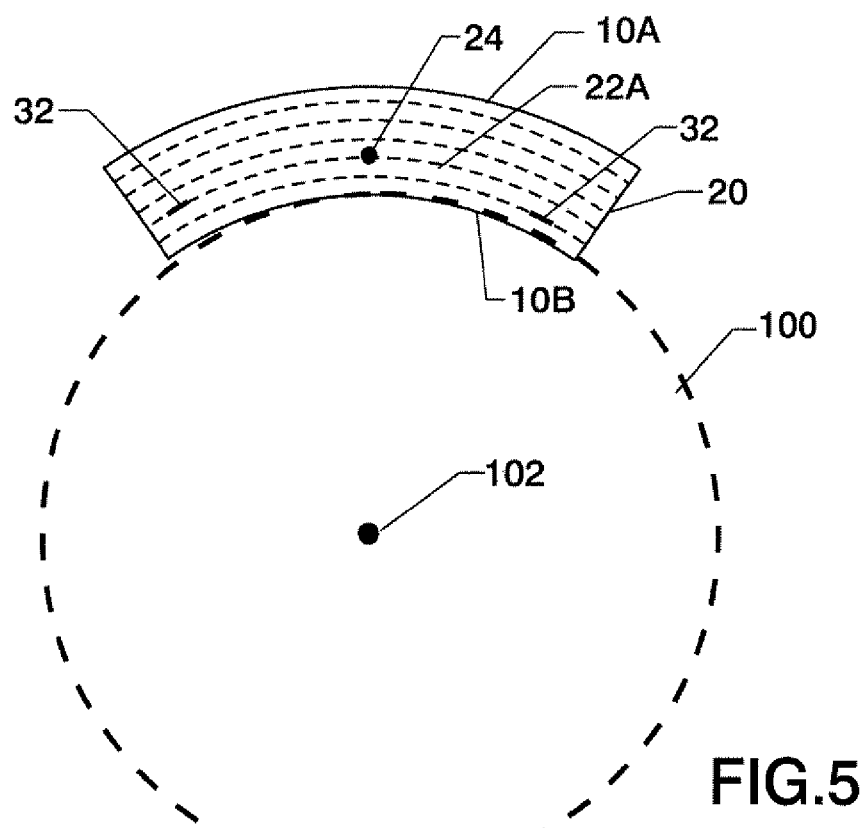
FIG. 5 is a cross-sectional view of the flow effector taken along line 5-5 in FIG. 4.
Figure 6:
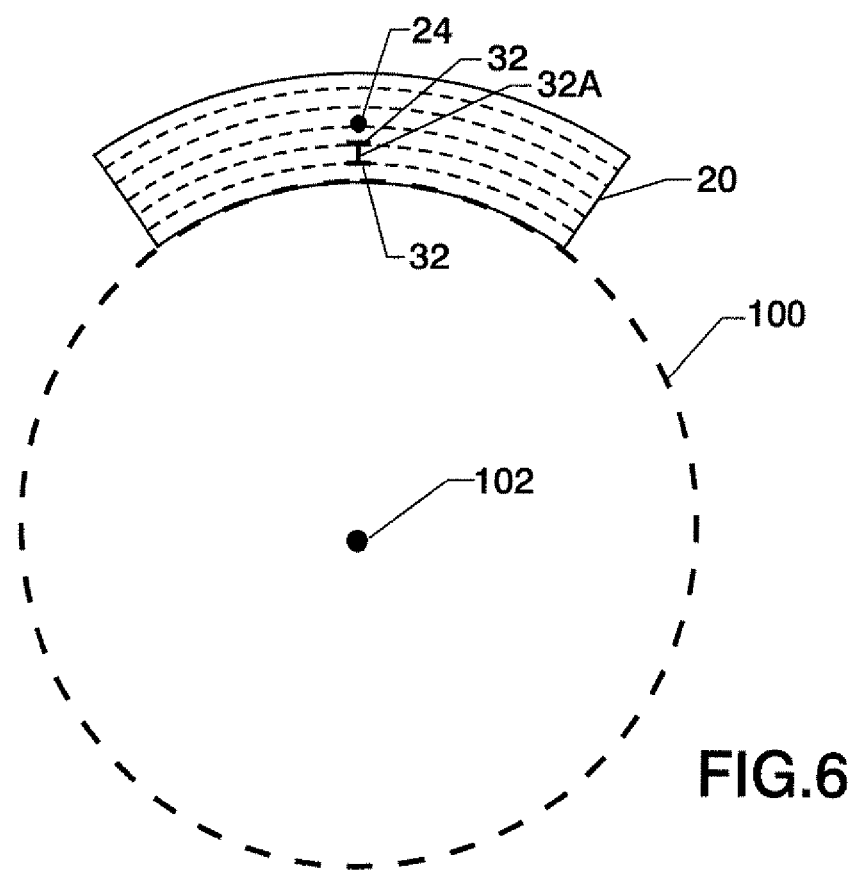
FIG. 6 is a cross-sectional view of the flow effector taken along line 6-6 in FIG. 4.

As mentioned above, each SMA member can be constructed from one or more SMAs. For example, the embodiment illustrated in FIGS. 4-6 is constructed using just two SMAs 32 arranged in a V-shape. SMAs 32 overlap at tip 16 and are electrically coupled to one another by an electrical connection 32A as shown in FIG. 6. Thus, SMAs 32 and electrical connection 32A define an electrical circuit accessible at root 14.

Figure 7:
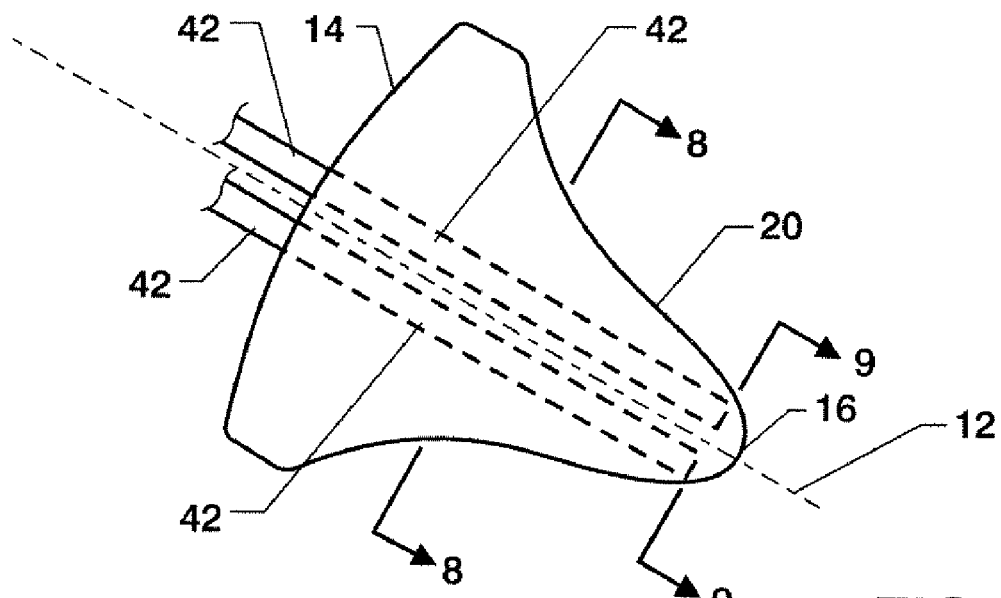
FIG. 7 is a top view of a chevron-shaped flow effector in accordance with still another embodiment of the present invention.
Figure 8:
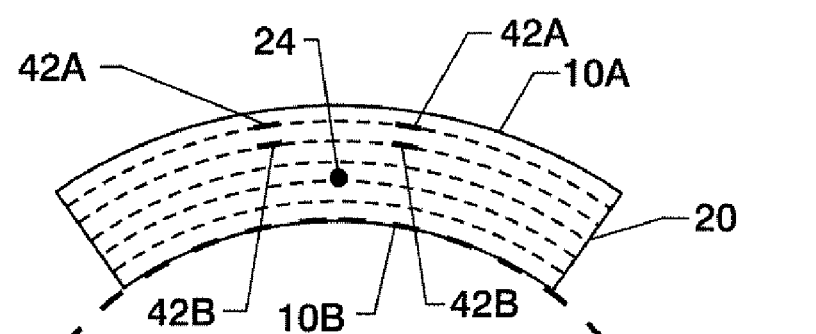
FIG. 8 is a cross-sectional view of the flow effector taken along line 8-8 in FIG. 7.
Figure 9:
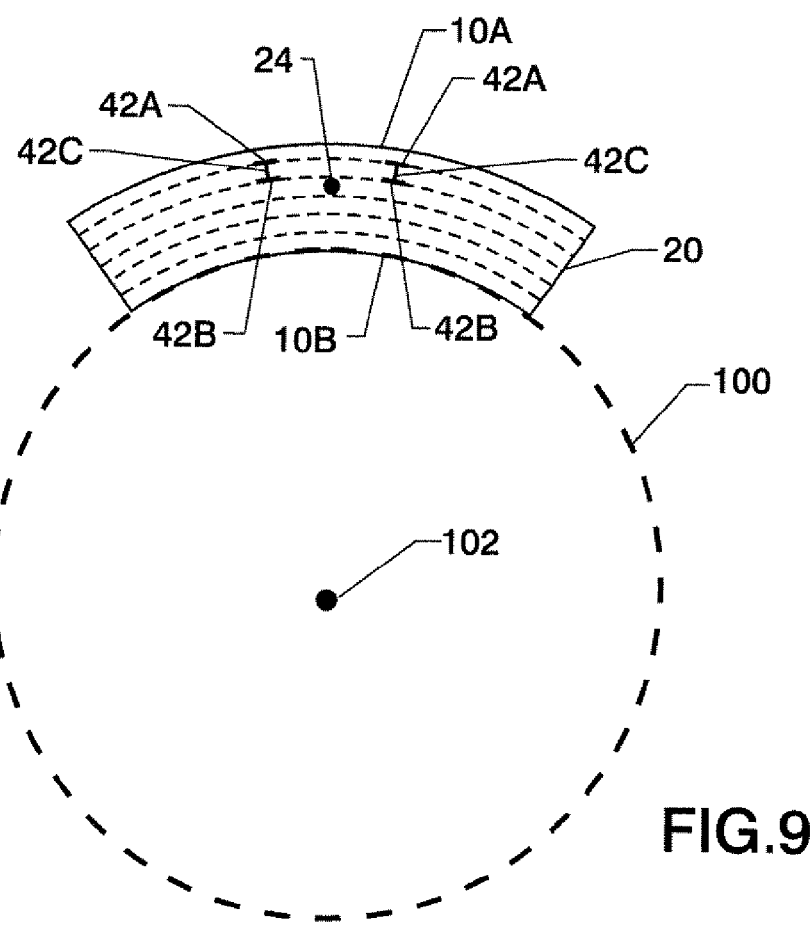
FIG. 9 is a cross-sectional view of the flow effector taken along line 9-9 in FIG. 7.

The present invention is not limited to construction that draws a chevron's tip towards the axial center of a jet engine nozzle exit. That is, the present invention also includes embodiments that can move the chevron tip away from the center of a nozzle exit. One such embodiment is illustrated in FIGS. 7-9 where SMA members 42 are disposed symmetrically about the chevron's center line 12. As in the previous embodiments, SMA members 42 span from root 14 to tip 16 with SMAs 42A and 42B disposed between layers of chevron body 20. At tip 16, SMAs 42A and 42B are electrically coupled by an electrical connection 42C. However, in this embodiment, SMA members 42 are closer to surface 10A than surface 10B so that they are disposed between surface 10A and neutral axis 24. Accordingly, when SMA members 42 are actuated at root 14 (i.e., either electrically or thermally) and contract, tip 16 will be drawn away from center 102 of nozzle exit 100. Note that while two SMA members 42 are illustrated, a single SMA member disposed about centerline 12 (or more than two SMA members) could be used without departing from the scope of the present invention.

Figure 10:
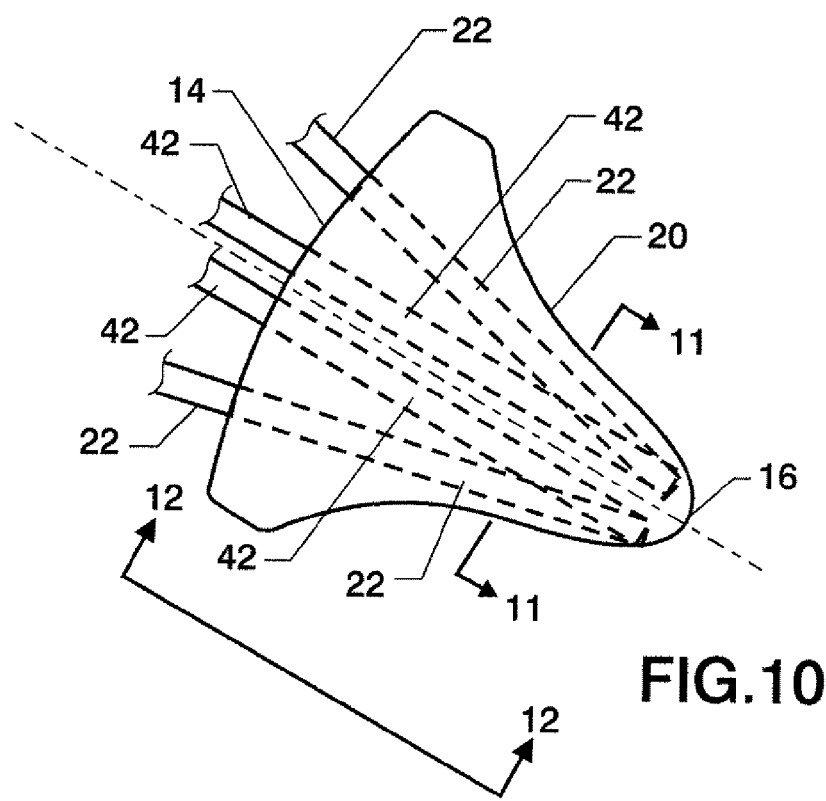
FIG. 10 is a top view of a chevron-shaped flow effector in accordance with yet another embodiment of the present invention.
Figure 11:
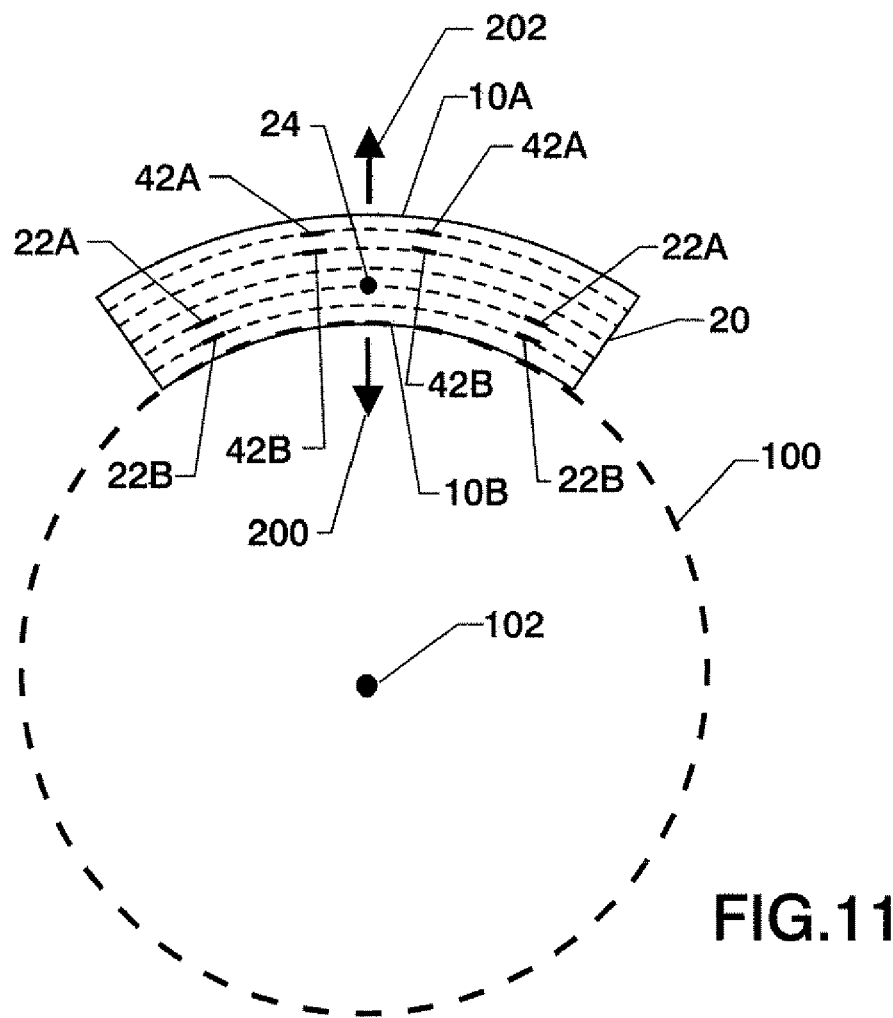
FIG. 11 is a cross-sectional view of the flow effector taken along line 11-11 in FIG. 10.
Figure 12:
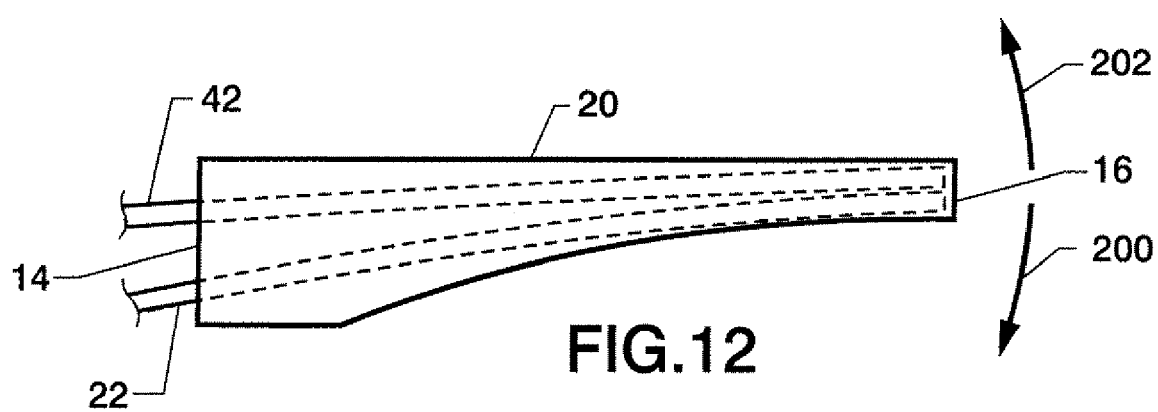
FIG. 12 is a side view of the flow effector taken along line 12-12 in FIG. 10.

The present invention is not limited to flow effector constructions that move the chevron tip either towards or away from the nozzle exit's center. Accordingly, FIGS. 10-12 illustrate a flow effector embodiment that combines two of the above-described embodiments. More specifically, SMA members 22 and SMA members 42 are embedded in chevron body 20. In operation, when SMA members 42 are in their non-actuated or relaxed state while SMA members 22 are actuated (contracted), tip 16 is drawn towards axial center 102 as indicated by arrow 200. Conversely, when SMA members 22 are in their non-actuated or relaxed state while SMA members 42 are activated (contracted), tip 16 is drawn away from axial center 102 as indicated by arrow 202.

The advantages of the present invention are numerous. By embedding SMA members on one or both sides of a flow effector's neutral axis, the active jet engine nozzle flow effectors described herein will provide jet engine designers with the building block needed to design/construct jet engines having lower noise signatures. Furthermore, the active nature of the flow effectors will allow optimization of noise reduction and continual adaptation of the chevron system configuration with operating conditions to maintain optimal performance. The novel flow effectors present flow surfaces that will not introduce unwanted disturbances into the exhaust flow at a jet engine nozzle exit.

The following text describes an example of two potential embodiments of the present invention and methods for their fabrication. This example is not intended to be limiting, but is only exemplary of the inventive features which are defined in the claims. The Example is as follows:

Two active chevron designs were devised to achieve the desired functionality, one that is powered to immerse (termed POR [power-off-retracted], see FIG. 1) into the flow and one that is powered to retract (termed POI [power-off-immersed], see FIG. 7). Prototypes of each chevron type were fabricated from glass-epoxy pre-preg and Nitinol ribbon actuator assemblies by a vacuum hot press approach. (As known in the art, Nitinol is an acronym for NIckel TItanium Naval Ordnance Laboratory, and is a family of intermetallic materials, which contain a nearly equal mixture of nickel and titanium.) Provisions for electrical continuity to the Nitinol actuators were accommodated to allow convenient and efficient active control and minimal overall structural thickness.

A SMA actuator material system consisting of glass-epoxy unidirectional pre-impregnated (pre-preg) tape and Nitinol ribbon was selected. The glass-epoxy matrix material offers electrical isolation for resistive heating of the SMA actuators and affords visual flaw detection. Pre-preg material is available in thin layers and affords precise control over directional stiffness. The glass-epoxy material was an S2-glass/3501-6 resin material system obtained from YLA, Inc. with a nominal cured ply thickness of 0.01 cm (0.004 inches). A Nitinol alloy was selected due to its electrical resistance, shape memory capability, and availability. The ribbon (rectangular cross section wire) configuration simplified the fabrication procedure, by minimizing the number of actuators, and the mechanical/electrical connectivity of the structure in service. The Nitinol ribbon was obtained with nominal cross section dimensions of 0.229×0.015 cm (0.090×0.006 inches) and transformation temperatures, as determined by differential scanning calorimetry, of $A_s=45°$ C. (113° F.), $A_f=60°$ C. (140° F.), $M_s=17°$ C. (62.6° F.), and $M_f=0°$ C. (32° F.).

The Nitinol ribbon material was prestrained (elongated) 4% and lightly sandblasted to remove the oxide layer for improved Nitinol-Nitinol joining and Nitinol-resin adhesion purposes. Pairs of the Nitinol ribbon were aligned and spot welded in an Argon atmosphere at a location along the length of the actuators convenient for placement at the intended chevron tip during the lamination process. The joint actually consisted of three consecutive welds approximately 0.127 cm (0.050 inches) apart and spanning approximately 0.254 cm (0.1 inches) of the actuator assembly length. A representative spot welding process was observed with an infrared camera and it was found that the thermal pulse traveling away from the weld site had a maximum temperature of approximately 32.2° C. (90° F.) closest to the weld and dissipated completely at a distance of less than 0.953 cm (0.375 inches) from the weld site.

The material dimensions and chevron design constraints required the use of at least five plies of glass-epoxy. Molds for the vacuum hot press were specifically designed to produce the two chevron types and have planform dimensions that allow for a range of chevron aspect ratios. Templates were fabricated for cutting glass-epoxy prepreg plies to fit the molds precisely. A transparency template was also created to accurately fit the mold so as to aid in placement of the actuator assemblies. Lamination of the POR chevron was performed according to the sequence (+45/SMA/−45/SMA/90/−45/+45), which positions the actuators on the concave side of the laminate middle surface (0° is aligned with the chevron centerline and a positive angle designation indicates counter-clockwise rotation). A layer of polyimide release film and bleeder cloth was inserted in the mold, followed by the first +45° ply. The first −45° ply was cut transversely with a longitudinal dimension that placed the cut edge ~0.178 cm (0.070 inches) short of the intended chevron tip. This −45° segment was inserted between the layers of Nitinol in the actuator assemblies tight against the first weld in each assembly, while the assemblies were arranged in approximately the correct configuration with the sacrificial ends interleaved. This assembly was positioned in the mold and the transparency template was inserted to make final adjustments to the actuator assembly positions. The result of this positioning was that all three welds were maintained within the net chevron geometry and as close to the tip as possible. Both ends of the Nitinol actuator assemblies were rigidly restrained in the lightly knurled clamping surfaces of the fore and aft resin dams to prevent movement during the remainder of the laminate assembly and during cure. The remaining segment of the first −45° ply was placed on top of the interleaved sacrificial ends of the actuator assemblies. The remaining plies (90/−45/+45) were added to the stack and it was topped with a layer of bleeder cloth and polyimide release film. Note that a separation between the actuator assemblies of 0.127 cm (0.050 inches) was planned at the chevron tip, positioning the cross-over location in the actuator assemblies just outside of the net shape. This cross-over location was by far the thickest part of the laminate because of the quadruple actuator thickness. Consolidation problems due to this thickness discontinuity were avoided by inserting a 0.318 cm-thick (0.125 inch-thick) layer of RTV casting compound (Airtech 3700) on top of the laminate. The matching steel ram for the mold was added to the top of the stack. Strategic placement of a recess in the mold surface is another option for accommodating the thickness discontinuity.

Lamination of the POI chevron was performed with the corresponding mold according to the sequence (+45/−45/90/SMA/−45/SMA/+45) in a manner similar to the POR chevron with the following notable differences. The actuator assemblies are embedded on the convex side of the laminate middle surface and parallel to the laminate centerline in this case. A layer of polyimide release film and bleeder cloth was inserted in the mold followed by the first three prepreg layers (+45/−45/90). The second −45° ply was cut transversely to a longitudinal dimension that placed the cut edge ~0.254 cm (0.1 inches) short of the intended chevron tip. This segment was assembled with the actuators so that insertion in the mold placed all three welds of the actuator assemblies within the intended net shape. A transparency template was used for final actuator alignment. Again, both ends of the actuator assemblies were rigidly restrained in the lightly knurled clamping surfaces of the fore and aft resin dams. The remaining segment of the second −45° ply was placed on top of the sacrificial ends of the actuator assemblies, the final +45° was applied, and the stack was topped with a layer of bleeder cloth and polyimide release film. Finally, the matching ram was installed on top of the stack.

Each laminate was subjected to the cure cycle recommended by the pre-preg manufacturer; heated from room temperature to 121.1° C. (250° F.) at 1.7-2.8° C./min (3-5° F./min), held for 15 minutes at 121.1° C. (250° F.), 586 kPa (85 psi) of pressure was applied, held at 121.1° C. (250° F.) and 586 kPa (85 psi) for an additional 45 minutes, heated again to 176.7° C. (350° F.) at 1.7-2.8° C./min (3-5° F./min) while holding 586 kPa (85 psi), held at 176.7° C. (350° F.) and 586 kPa (85 psi) for 2 hours, cooled to room temperature at 1.7-2.8° C./min (3-5° F./min) while holding 586 kPa (85 psi), and the pressure was released at room temperature. The resulting consolidated laminates were machined to final chevron dimensions. The Nitinol leads remaining at the root edge of the chevron were copper plated to enable soldering to the leads and to improve contact-type electrical connections.

Although both laminates are asymmetric due to the embedded Nitinol ribbon, no warping of the laminates result after cure because the restraint on the actuators prevents recovery of the prestrain and participation in generation of a thermal moment during cooling. The POI chevron exhibited a thickness of ~0.061 cm (0.024 inches) and ~0.069 cm (0.027 inches) in regions without and with the embedded Nitinol, respectively, but was largely uniform within a region. The thickness difference between the two regions was shared on both sides of the laminate. The POR chevron exhibited a greater thickness variation between the two regions, with corresponding thicknesses of ~0.048 cm (0.019 inches) and ~0.071 cm (0.028 inches), and a slightly greater variation in thickness in the region between the Nitinol actuators. The thickness difference between the two regions was carried entirely on the convex side of the laminate in the POR case. The greater thickness variation and one-sided nature of the discontinuity was attributable to the flexible rubber layer on the top of the laminate. Fabrication of the POR chevron by the alternate approach involving the strategic recess in the mold surface produced parts with similar thickness distribution and variation as the POI chevrons.

The chevron prototypes were subjected to a total of 55 thermal cycles between room temperature and 132.2° C. (270° F.), while measuring the full-field temperature and out-of-plane displacement distributions. Both chevron types exhibited very repeatable performance, achieving the desired functionality without and with representative flow loading.

Figure 13:
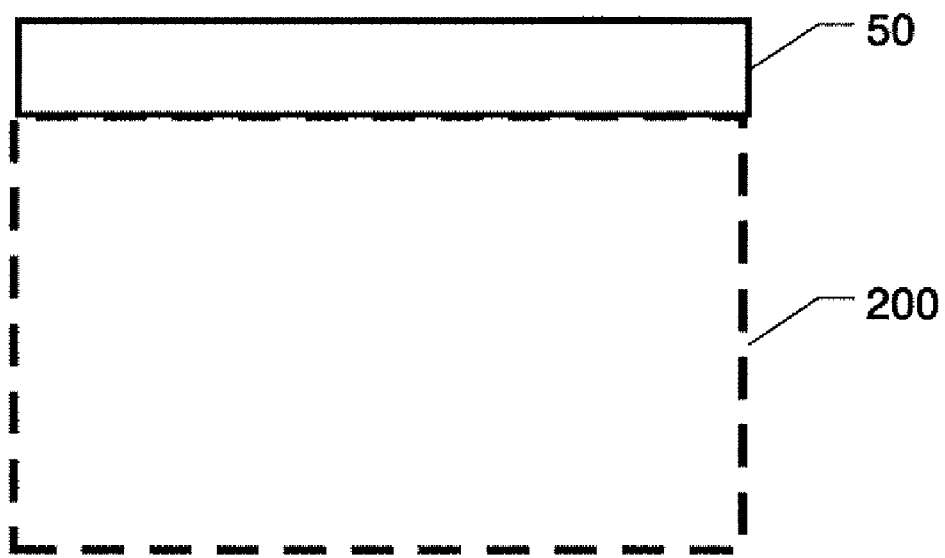
FIG. 13 is a cross-sectional view of another embodiment of a flow effector for use with a jet engine exhaust nozzle exit that is rectangular.
Figure 14:
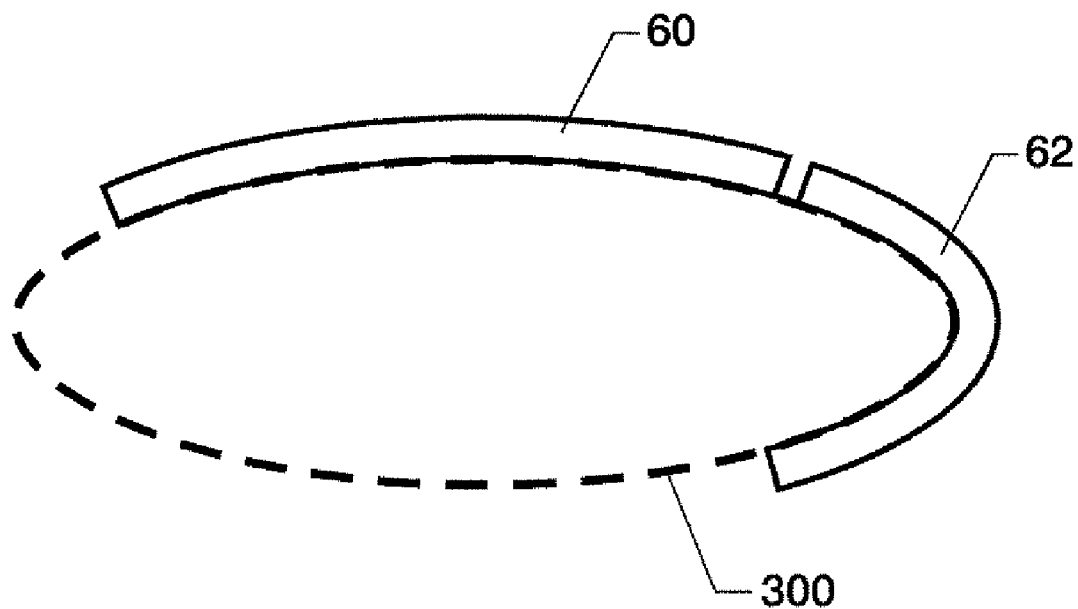
FIG. 14 is a cross-sectional view of another embodiment of a flow effector for use with a jet engine exhaust nozzle that is elliptical.

Although the invention has been described relative to specific embodiments thereof, and an example describing the construction of two specific chevrons has been given, nevertheless, there are numerous variations and modifications that will be readily apparent to those skilled in the art in light of the above teachings. As mentioned above, the chevron's radius of curvature need not be cylindrical. For example, FIG. 13 illustrates a rectangular nozzle exit 200 and a chevron body 50 that is flat, i.e., an infinite radius of curvature. Only one chevron body is illustrated so that the shape of nozzle exit 200 is visible. Furthermore, not all chevrons at a nozzle exit need to have the same size, shape or radius of curvature. For example, FIG. 14 illustrates an elliptical nozzle exit 300 where chevron bodies 60 and 62 have different radius of curvatures. Once again, only two chevron bodies are illustrated so that the shape of nozzle exit 300 is visible. It is therefore to be understood that, within the scope of the appended claims, the invention may be practiced other than as specifically described.

What is claimed as new and desired to be secured by Letters Patent of the United States is:

1. A jet engine exhaust nozzle flow effector, comprising:
an elastically deformable chevron having a root and a tip, said chevron formed to have a radius of curvature adapted to match a portion of the geometry of a jet engine exhaust nozzle exit such that an inner surface and an outer surface are defined and oppose one another with said inner surface facing a center of the nozzle exit; and
at least one shape memory alloy (SMA) member embedded in said chevron to be closer to said inner surface than said outer surface and substantially spanning from at least a portion of said root to said tip; wherein said at least one SMA member comprises first and second SMA members arranged substantially in a V-shape with an apex of said V-shape located in proximity to said tip, and wherein said apex is located closer to said tip than said root.

2. A jet engine exhaust nozzle flow effector as in claim 1 wherein said first and second SMA members are coupled to one another at said apex to provide at least one of electrical conductivity and thermal conductivity therebetween.

3. A jet engine exhaust nozzle flow effector as in claim 1 wherein said chevron comprises a laminated structure with said at least one SMA member disposed between layers thereof.

4. A jet engine exhaust nozzle flow effector, comprising:
an elastically deformable chevron having a root and a tip with a centerline of said chevron extending from said root to said tip, said chevron formed to have a radius of curvature symmetric about said centerline with an inner surface and an outer surface of said chevron being defined and opposing one another, said chevron having a neutral axis extending from said root to said tip; and
at least one shape memory alloy (SMA) member embedded in said chevron to be (i) non-coincident with said neutral axis, and (ii) substantially spanning from at least a portion of said root to said tip wherein, when said at least one SMA member contracts, said tip moves into a region defined by said radius of curvature; and wherein said at least one SMA member comprises first and second SMA members arranged substantially in a V-shape with an apex of said V-shape located in proximity to said tip, and wherein said apex is located closer to said tip than said root.

5. A jet engine exhaust nozzle flow effector as in claim 4 wherein said first and second SMA members are coupled to one another at said apex to provide at least one of electrical conductivity and thermal conductivity therebetween.

6. A jet engine exhaust nozzle flow effector as in claim 4 further comprising at least one additional SMA member embedded in said chevron to be (i) non-coincident with said neutral axis, and (ii) substantially spanning from at least a portion of said root to said tip wherein, when said at least one SMA member is in a relaxed state while said at least one additional SMA member is contracted, said tip moves out of said region defined by said radius of curvature.

7. A jet engine exhaust nozzle flow effector as in claim 6 wherein said at least one additional SMA member is symmetrically disposed about the centerline of said chevron.

8. A jet engine exhaust nozzle flow effector as in claim 6 wherein each said at least one additional SMA member is configured to be activated at a portion thereof that is in proximity to said root.

9. A jet engine exhaust nozzle flow effector as in claim 4 wherein said chevron comprises a laminated structure with said at least one SMA member disposed between layers thereof.

10. A jet engine exhaust nozzle flow effector, comprising:
an elastically deformable chevron having a root and a tip with said root adapted to be fixedly coupled to a portion of a nozzle of a jet engine to thereby position said tip aft of the jet engine's nozzle exit wherein the nozzle exit has an axial center, said chevron formed to have a radius of curvature adapted to match the geometry of a portion of the nozzle exit such that an inner surface and an outer surface are defined and oppose one another with said inner surface facing a center of the nozzle exit; and at least one shape memory alloy (SMA) member embedded in said chevron to be closer to said inner surface than said outer surface and substantially spanning from at least a portion of said root to said tip wherein, when said at least one SMA member contracts, said tip moves towards the axial center of the nozzle exit; and wherein said at least one SMA member comprises first and second SMA members arranged substantially in a V-shape with an apex of said V-shape located in proximity to said tip, and wherein said apex is located closer to said tip than said root.

11. A jet engine exhaust nozzle flow effector as in claim 10 wherein said first and second SMA members are coupled to one another at said apex to provide at least one of electrical conductivity and thermal conductivity therebetween.

12. A jet engine exhaust nozzle flow effector as in claim 10 wherein said chevron comprises a laminated structure with said at least one SMA member disposed between layers thereof.

13. A jet engine exhaust nozzle flow effector, comprising: an elastically deformable chevron having a root and a tip with a centerline of said chevron extending from said root to said tip, said chevron formed to have a radius of curvature symmetric about said centerline with an inner surface and an outer surface of said chevron being defined and opposing one another, said chevron having a neutral axis extending from said root to said tip; and at least one shape memory alloy (SMA) member embedded in said chevron to be (i) non-coincident with said neutral axis, and (ii) substantially spanning from at least a portion of said root to said tip wherein, when said at least one SMA member contracts, said tip moves out of a region defined by said radius of curvature; and wherein said at least one SMA member comprises first and second SMA members arranged substantially in a V-shape with an apex of said V-shape located in proximity to said tip, and wherein said apex is located closer to said tip than said root.

14. A jet engine exhaust nozzle flow effector as in claim 13 wherein said at least one SMA member is symmetrically disposed about said centerline of said chevron.

15. A jet engine exhaust nozzle flow effector as in claim 13 wherein each said at least one SMA member is configured to be activated at a portion thereof that is in proximity to said root.

16. A jet engine exhaust nozzle flow effector as in claim 13 further comprising at least one additional SMA member embedded in said chevron to be (i) non-coincident with said neutral axis, and (ii) substantially spanning from at least a portion of said root to said tip wherein, when said at least one SMA member is in a relaxed state while said at least one additional SMA member is contracted, said tip moves into said region defined by said radius of curvature.

17. A jet engine exhaust nozzle flow effector as in claim 13 wherein said first and second SMA members are coupled to one another at said apex to provide at least one of electrical conductivity and thermal conductivity therebetween.

18. A jet engine exhaust nozzle flow effector as in claim 13 wherein said chevron comprises a laminated structure with said at least one SMA member disposed between layers thereof.

* * * * *